United States Patent
Chung et al.

(10) Patent No.: US 9,286,552 B2
(45) Date of Patent: Mar. 15, 2016

(54) IMAGE FORMING APPARATUS, IMAGE FORMING METHOD, AND COMPUTER-READABLE RECORDING MEDIUM

(71) Applicant: Samsung Electronics Co., Ltd, Suwon-si, Gyeonggi-do (KR)

(72) Inventors: Tae-joon Chung, Seoul (KR); Yeon-jung Lim, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 75 days.

(21) Appl. No.: 13/866,139

(22) Filed: Apr. 19, 2013

(65) Prior Publication Data

US 2014/0126012 A1    May 8, 2014

(30) Foreign Application Priority Data

Nov. 8, 2012 (KR) .................. 10-2012-0126266

(51) Int. Cl.
  *G06F 3/12* (2006.01)
  *G06K 15/02* (2006.01)
  *G06K 15/00* (2006.01)

(52) U.S. Cl.
  CPC ........ *G06K 15/1801* (2013.01); *G06K 15/1817* (2013.01); *G06K 15/4055* (2013.01); *G06K 15/406* (2013.01)

(58) Field of Classification Search
  None
  See application file for complete search history.

(56) References Cited

U.S. PATENT DOCUMENTS

| | | | | |
|---|---|---|---|---|
| 5,276,890 A * | 1/1994 | Arai | ........................ | G06F 9/461 713/1 |
| 5,884,122 A * | 3/1999 | Kawabuchi | ........ | G03G 15/5004 399/43 |
| 7,483,163 B2 * | 1/2009 | Tsukada | ................ | G06K 15/00 358/1.15 |
| 7,800,772 B2 * | 9/2010 | Hamada | ................ | G06F 9/5027 358/1.15 |
| 8,184,311 B2 * | 5/2012 | Sakai | .................... | G06F 21/608 340/5.6 |
| 8,312,313 B2 * | 11/2012 | Kitora | ................ | G06F 11/1497 713/310 |
| 8,769,185 B2 * | 7/2014 | Chung | ................ | G06F 12/0866 709/222 |
| 8,890,007 B2 * | 11/2014 | Garner | ................ | A22B 5/0064 177/126 |
| 2001/0025343 A1 * | 9/2001 | Chrisop | ................ | G06F 21/608 713/193 |
| 2001/0055234 A1 * | 12/2001 | Mori | ..................... | G11C 5/141 365/228 |
| 2002/0060703 A1 * | 5/2002 | Tsukada | ................ | G06K 15/00 347/5 |
| 2002/0171867 A1 * | 11/2002 | Nobuhara | .......... | H04N 1/00408 358/1.15 |
| 2004/0153759 A1 * | 8/2004 | Motegi | ...................... | H04L 1/22 714/14 |
| 2005/0243364 A1 * | 11/2005 | Sakai | .................... | G06F 9/5027 358/419 |
| 2007/0121172 A1 * | 5/2007 | Hamada | ................ | G06F 9/5027 358/419 |
| 2009/0106480 A1 * | 4/2009 | Chung | ................ | G06F 12/0866 711/100 |
| 2010/0174940 A1 * | 7/2010 | Kitora | ................ | G06F 11/1497 714/6.32 |

* cited by examiner

Primary Examiner — Marcus T Riley
(74) Attorney, Agent, or Firm — Staas & Halsey LLP

(57) ABSTRACT

An image forming apparatus includes a communication interface unit which receives print data, an image forming unit which prints the received print data, a volatile memory which, if the received print data is data that needs to be stored, stores the received print data, and a controller which, if a power-off command regarding the image forming apparatus is input, backs up print data stored in the volatile memory in a storage medium connectable to the image forming apparatus and converts an operation mode of the image forming apparatus to a power-off mode.

22 Claims, 9 Drawing Sheets

FIG. 4

| INDEX | JOB ID | JOB TYPE | STORAGE FILE INFORMATION | ... |
|---|---|---|---|---|
| 1 | 5 | GENERAL STORAGE PRINTING | xxx_5. JCB<br>xxx_5. INF<br>xxx_5. DAT | ... |
| 2 | 6 | SECURITY STORAGE PRINTING | xxx_6. JCB<br>xxx_6. INF<br>xxx_6. DAT | ... |
| 3 | 7 | SECURITY STORAGE PRINTING | xxx_8. JCB<br>xxx_8. INF<br>xxx_8. DAT | ... |
| 4 | 0 | - | - | ... |

IMAGE FORMING APPARATUS, IMAGE FORMING METHOD, AND COMPUTER-READABLE RECORDING MEDIUM

CROSS-REFERENCE TO RELATED APPLICATIONS

This application claims the benefit of Korean Patent Application No. 2012-126266, filed in the Korean Intellectual Property Office on Nov. 8, 2012, the content of which is incorporated herein by reference in its entirety.

BACKGROUND OF THE INVENTION

1. Field of the Invention

The present general inventive concept relates to an image forming apparatus, an image forming method, and a computer-readable recording medium, and more particularly, to an image forming apparatus capable of preventing loss of print data stored in a volatile memory of the image forming apparatus, an image forming method, and a computer-recording medium.

2. Description of the Related Art

An image forming apparatus refers to an apparatus which prints print data generated by a terminal apparatus such as a computer on a recording paper, and examples of an image forming apparatus include a copy machine, a printer, a fax machine, and a Multi-Function Peripheral (MFP) which performs all of the above functions in a single device.

Recently, an image forming apparatus may be capable of not only printing print data transmitted from an external apparatus, but also supporting the functions which allow a plurality of users to approach and print pre-stored print data, and store it for security reasons so that the print data may be opened and output by an individual user.

As such, in order to store print data and use it for a printing job, an image forming apparatus needs a storage area for storing the print data. However, an image forming apparatus does not have such a large-scale storage medium in general, and thus it is not possible for the image forming apparatus to perform such an operation. Even if an image forming apparatus may perform such an operation, the print data is stored in a volatile memory. As a result, as soon as the power of the image forming apparatus is turned off, the stored print data disappears, causing problems.

SUMMARY OF THE INVENTION

A present general inventive concept provides an image forming apparatus capable of preventing loss of print data stored in a volatile memory of the image forming apparatus, an image forming method, and a computer-recording medium.

Additional features and utilities of the present general inventive concept will be set forth in part in the description which follows and, in part, will be obvious from the description, or may be learned by practice of the general inventive concept.

Exemplary embodiments of the present inventive concept provide an image forming apparatus that includes a communication interface unit which receives print data, an image forming unit which prints the received print data, a volatile memory which, if the received print data is data that needs to be stored, stores the received print data, and a controller which, if a power-off command regarding the image forming apparatus is input, backs up print data stored in the volatile memory in a storage medium connectable to the image forming apparatus and converts an operation mode of the image forming apparatus to a power-off mode.

The apparatus may further include an encryption unit which encrypts the print data, and the controller may back up the encrypted print data in the storage medium.

The controller may back up the encrypted print data in the storage medium using a predetermined extension.

The apparatus may further a user interface unit which if a power-off command regarding the image forming apparatus is input and print data is stored in the volatile memory, receives confirmation regarding whether the stored print data is backed up, and the controller, if a back-up command is input through the user interface unit, may back up print data stored in the volatile memory in the storage medium.

The apparatus may further include a user interface unit which, if a power-off command regarding the image forming apparatus is input and there is no storage medium connectable to the image forming apparatus, displays that connection with a storage medium is required.

The controller may set a back-up flag informing existence of back-up data regarding print data in a predetermined area of a non-volatile memory of the image forming apparatus.

The controller, if the image forming apparatus is turned on, may restore print data backed up in the storage medium to the volatile memory.

The controller, if the backed-up print data is restored to the volatile memory, may delete the print data backed up in the storage medium.

The controller, if the image forming apparatus is booted, may determine whether there is back-up data regarding print data by checking whether 'a back-up flag informing existence of back-up data regarding print data' is set in a non-volatile memory.

The controller, if the print data is received, may store the received print data in the volatile memory by job unit.

The received print data may include information regarding at least one of whether the print data is stored and whether the print data is secured.

Exemplary embodiments of the present inventive concept also provide an image forming method of an image forming apparatus that includes receiving print data, printing the received print data, if the received print data is data that needs to be stored, storing the received print data in a volatile memory, if a power-off command regarding the image forming apparatus is input, backing up print data stored in the volatile memory in a storage medium connectable to the image forming apparatus, and converting an operation mode of the image forming apparatus to a power-off mode.

The method may further include encrypting the print data, and the encrypting may include backing up the encrypted print data in the storage medium.

The backing up may include backing up the encrypted print data in the storage medium using a predetermined extension.

The method may further include, if a power-off command regarding the image forming apparatus is input and print data is stored in the volatile memory, receiving confirmation regarding whether the stored print data is backed up, and the backing up may include, if a back-up command is input through the user interface unit, backing up print data stored in the volatile memory in the storage medium.

The method may further include, if a power-off command regarding the image forming apparatus is input and there is no storage medium connectable to the image forming apparatus, displaying that connection with a storage medium is required.

The method may further include setting a back-up flag informing existence of back-up data regarding print data in a predetermined area of a non-volatile memory of the image forming apparatus.

The method may further include, if the image forming apparatus is turned on, restoring print data backed up in the storage medium to the volatile memory.

The method may further include, if the backed-up print data is restored to the volatile memory, deleting the print data backed up in the storage medium.

The method may further include, if the image forming apparatus is booted, determining whether there is back-up data regarding print data by checking whether 'a back-up flag informing existence of back-up data regarding print data' is set in a non-volatile memory.

The storing may include, if the print data is received, storing the received print data in the volatile memory by job unit.

The received print data may include information regarding at least one of whether the print data is stored and whether the print data is secured.

Exemplary embodiments of the present inventive concept also provide an a computer readable recording medium including a program to execute an image forming method according to an exemplary embodiment, where the method includes receiving print data, printing the received print data, if the received print data is data that needs to be stored, storing the received print data in a volatile memory, if a power-off command regarding the image forming apparatus is input, backing up print data stored in the volatile memory in a storage medium connectable to the image forming apparatus, and converting an operation mode of the image forming apparatus to a power-off mode.

Exemplary embodiments of the present inventive concept also provide an image forming apparatus, comprising: a volatile memory which stores print data received from an external source if the receive print data is a type of data that needs to be stored; and a controller which, if a power-off command regarding the image forming apparatus is input, backs up the print data stored in the volatile memory in a storage medium connectable to the image forming apparatus and converts an operation mode of the image forming apparatus to a power-off mode.

In an exemplary embodiment, the image forming apparatus may further include: an encryption unit which encrypts the print data, wherein the controller backs up the encrypted print data in the storage medium.

In an exemplary embodiment, the image forming apparatus may further include: a user interface unit which, if a power-off command regarding the image forming apparatus is input and there is no storage medium connectable to the image forming apparatus, displays that connection with a storage medium is required.

Exemplary embodiments of the present inventive concept also provide an image forming method of an image forming apparatus, the method comprising: determining whether print data received from an external source is data that needs to be stored, and if it is determined that the print data needs to be stored, storing the received print data in a volatile memory; backing up the print data stored in the volatile memory in a storage medium connectable to the image forming apparatus when a power-off command regarding the image forming apparatus is input; and converting an operation mode of the image forming apparatus to a power-off mode.

In an exemplary embodiment, the method may further include: if a power-off command regarding the image forming apparatus is input and there is no storage medium connectable to the image forming apparatus, displaying that connection with a storage medium is required.

In an exemplary embodiment, the method may further include: encrypting the print data, wherein the encrypting comprises backing up the encrypted print data in the storage medium.

In an exemplary embodiment the method may further include: setting a back-up flag informing existence of back-up data regarding print data in a predetermined area of a non-volatile memory of the image forming apparatus.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 4 is a view illustrating an example of a look-up table which can be stored in a volatile memory;

DETAILED DESCRIPTION OF THE PREFERRED EMBODIMENTS

Figure 1:
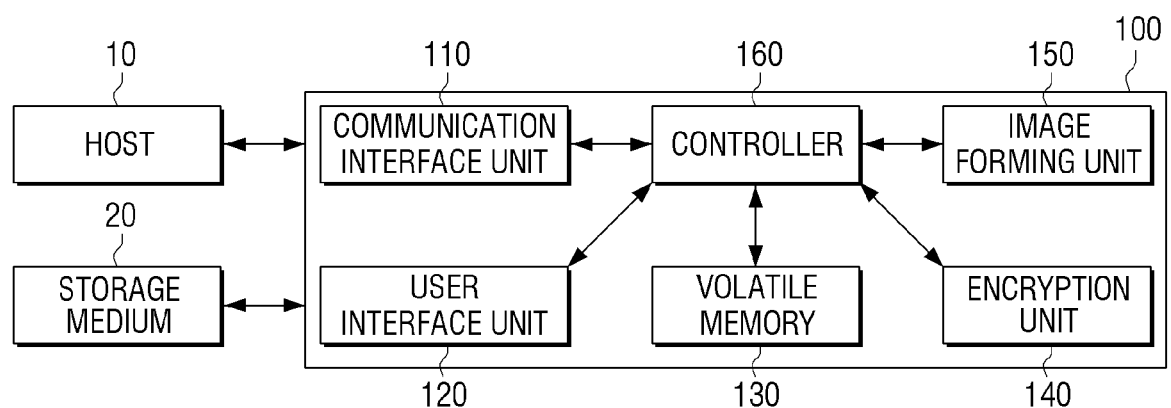
FIG. 1 is a block diagram illustrating configuration of an image forming apparatus according to an exemplary embodiment.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating configuration of an image forming apparatus according to an exemplary embodiment.

Referring to FIG. 1, an image forming apparatus 100 according to an exemplary embodiment comprises a communication interface unit 110, a user interface unit 120, a volatile memory 130, an encryption unit 140, an image forming unit 150, and a controller 160. Herein, the image forming apparatus may be a copy machine, a printer, a fax machine, or a Multi-Function Peripheral (MFP) which performs all of the above listed functions in a single device.

The communication interface unit 110 is formed to connect the image forming apparatus 100 to a host apparatus 10, and may be connected not only through a Local Area Network (LAN) and an Internet network, but also through a Universal Serial Bus (USB) port. Herein, the host apparatus 10 may be a printing control terminal apparatus of a Personal Computer (PC), a notebook PC, a tablet PC, a smart phone, a PMP, and so on.

The communication interface unit 110 may receive print data from the host apparatus 10. Herein, the print data may be data of printing language such as Postscript (PS), Printer Control Language (PCL) and etc., and if direct-printing is supported by the image forming apparatus 100, may be a PDF, XPS, BMP, JPG, a text document (TXT), etc.

In addition, the communication interface unit 110 may receive information regarding whether the print data received from the host apparatus 10 is stored and secured in the image forming apparatus 100, and such information may be included in the print data and received therein.

The communication interface unit 110 is formed to connect the image forming apparatus 100 to a storage medium 20, and may be connected not only through a USB port, but also through Local Area Network (LAN) and an Internet network. Herein, the storage medium 20 may be a removable disk including a USB memory, a web server via network, a SMB server, and so on.

The communication interface unit 110 may transmit print data stored in the volatile memory 130, which will be explained later, to the storage medium 20, and receive print data which is backed up in the storage medium 20.

The communication interface unit 110 may receive a power-off command from the host apparatus 10, and the communication interface unit 110 may transmit state information of the image forming apparatus 100 to the host apparatus 10. For example, a UI of FIG. 2 and FIG. 3 may be transmitted to the host apparatus 10.

The communication interface unit 110 may receive a printing command regarding pre-stored print data. To be specific, the communication interface unit 110 may receive a printing command regarding print data stored in the volatile memory 130, which will be explained later. In this case, the communication interface unit 110 may provide the host apparatus 10 with a list of print data stored in the volatile memory 130 in advance.

The user interface unit 120 may comprise a plurality of function keys through which a user may set or select various functions supported by the image forming apparatus 100, and may display various information provided by the image forming apparatus 100. The user interface unit 120 may be realized as an apparatus such as a touch screen, which can perform input and output simultaneously, or may be realized by combining a mouse and a monitor.

Figure 2:
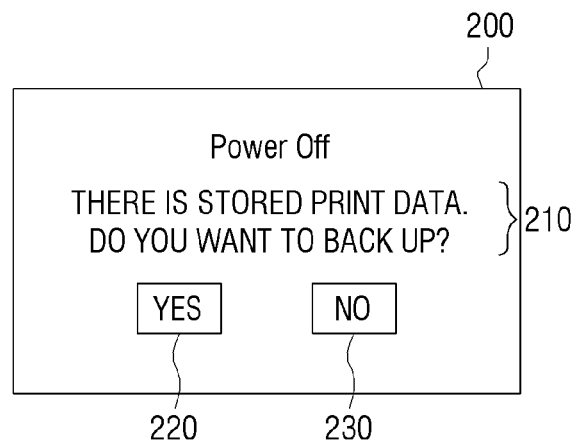
FIGS. 2 and 3 are views illustrating various examples of a user interface window which can be displayed on a user interface unit of FIG. 1.
Figure 3:
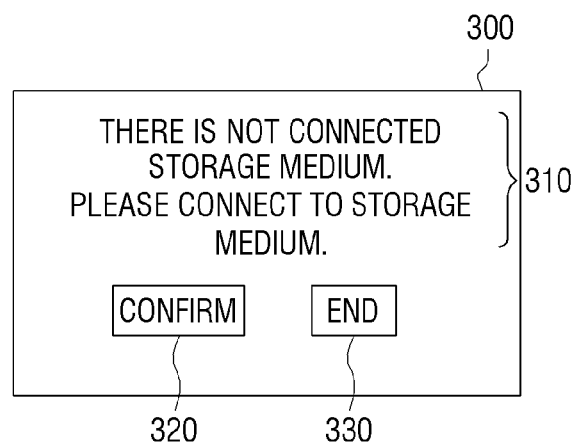

The user interface unit 120 may receive a power-off command from a user. In addition, the user interface unit 120 may display an alarm message regarding a back-up operation. To be specific, the user interface unit 120 may display information regarding whether there is a back-up operation or whether a storage medium is connected from a user as illustrated in FIG. 2 and FIG. 3. Further, if the storage capacity of a connected storage medium is not sufficient, the user interface unit 120 may display that there is not a sufficient amount of storage capacity in the storage medium.

The user interface unit 120 may receive a printing command regarding pre-stored print data. Specifically, the user interface unit 120 may display a list of print data stored in the volatile memory 130, which will be explained later, and receive a printing command regarding at least one print data on the displayed list.

The volatile memory 130 stores the received print data. Specifically, if the print data received through the communication interface unit 110 is data to be stored, the volatile memory 130 may store the received print data. In this case, the volatile memory 130 may categorize the received print data by job unit and then store the data, and may store information regarding each of the print data, such as job characteristics, in the form of a look-up table, as illustrated in FIG. 4. Such print data may be stored in a job storage area of the volatile memory (for example, RAM-DISC).

The encryption unit 140 encrypts print data. Specifically, if received print data requires encryption, the encryption unit 140 may perform encryption of the corresponding print data. In this case, the encryption unit 140 may use a serial number of the image forming apparatus 100 as a seed value, generate a key value by processing a hash function regarding the corresponding seed value (for example, MD5 and SHA256), and perform encryption of the corresponding print data using the generated key value. In this case, the encryption unit 140 may perform encryption using a symmetric key algorithm (AES, DES).

Meanwhile, in the above exemplary embodiment, only a serial number is used as a seed value, but other intrinsic numbers given to the image forming apparatus 100 (for example, MAC, IP address, and so on) may be used as a seed value. In addition, in the above exemplary embodiment, only the hash function and the symmetric algorithm are used, but other functions and algorithms may be used to perform encryption.

The encryption unit 140 also decrypts the encrypted print data. Specifically, if print data stored in the storage medium 20 is encrypted data, the encryption unit 140 may decrypted the encrypted data into print data.

The image forming unit 150 prints the received print data. Specifically, the image forming unit 150 may form an image regarding the print data received through the communication interface unit 110 or the print data pre-stored in the volatile memory 130. In the above exemplary embodiment, only the image forming unit 150 which performs a printing job is illustrated, but if the image forming apparatus 100 is an MFP capable of performing a scanning job, a faxing job, etc., the image forming apparatus 100 may further comprise a component which performs a scanning job and a fax transmission/reception job.

The controller 160 controls each component of the image forming apparatus 100. Specifically, if print data is received through the communication interface unit 110, the controller 160 may control the image forming unit 150 to perform a printing job with respect to the received print data.

In addition, the controller 160 determines whether it is necessary to store the received print data. Specifically, if the type of document of the received print data is a storage document (for example, a general storage document and a security storage document), the controller 160 may store the received print data in the volatile memory 130 by job unit, and update a job list (that is, a look-up table) stored in the volatile memory 130.

If a power-off command is input through the user interface unit 120 or the communication interface unit 110, the controller 160 determines whether it is necessary to back up the print data stored in the volatile memory 130. Specifically, the controller 160 may determine whether it is necessary to perform a back-up operation by checking whether there is print data in the volatile memory 130. For example, if print data is not stored in the volatile memory 130, or if the stored print data is not a storage document which needs to be stored, the controller 160 may determine that it is not necessary to perform a back-up operation. On the other hand, if a storage document which needs to be stored is stored in the volatile memory 130, the controller 160 may determine that it is necessary to perform a back-up operation.

In addition, the controller 160 may receive a confirmation regarding a back-up operation. Specifically, if a power-off command is input, and if it is determined that a back-up operation is required, the controller 160 may control the user interface unit 120 to display that a back-up operation is required. According to an exemplary embodiment, the controller 160 may control the communication interface unit 110 to transmit a message informing of the necessity of a back-up operation to the corresponding host apparatus 10 so that the above displaying operation may be performed in the host apparatus 10.

Accordingly, if a command to perform a back-up operation is input, the controller 160 performs the back-up operation, and if a command to perform a back-up operation is not input, the controller 160 may convert the operation mode of the image forming apparatus 100 to a power-off mode without performing any back-up operation.

Subsequently, the controller 160 determines whether the storage medium 20 is connected. Specifically, the controller 160 may determine whether a storage medium to back up data is connected to the image forming apparatus 100.

If the storage medium 20 is not connected to the image forming apparatus 100, the controller 160 may control the user interface unit 120 to display a notification that it is necessary to connect to a storage medium. According to an exemplary embodiment, the controller 160 may control the communication interface unit 110 to transmit a message informing of the necessity of connection with a storage medium 20 to the host apparatus 10 so that the above displaying operation may be performed in the host apparatus 10.

In addition, the controller 160 may determine whether the connected storage medium 20 has enough storage capacity. Specifically, the controller 160 may determine whether the print data stored in the volatile memory 130 can be stored in the connected storage medium 20, and if the connected storage medium 20 does not have sufficient storage capacity, the controller 160 may control the user interface unit 120 to display an indication of the lack of sufficient storage space in the storage medium 20. According to an exemplary embodiment, the controller 160 may control the communication interface unit 110 to transmit an alarm message informing of the lack of sufficient storage capacity of the storage medium to the host apparatus 10 so that the above displaying operation may be performed in the host apparatus 10.

Further, the controller 160 may back up the print data stored in the volatile memory 130. Specifically, if the job type of the print data stored in the volatile memory 130 is a storage document, the controller 160 may copy and back up the corresponding print data in the storage medium 20, and if the job type of the print data stored in the volatile memory 130 is a security document, the controller 160 may control the encryption unit 140 to perform encryption regarding the corresponding print data, and copy and back up the encrypted print data in the storage medium 20. In this case, the controller 160 may store the encrypted print data using a predetermined extension (for example, ENC1, ENC2, . . . ).

Meanwhile, in the exemplary embodiment, encryption is performed in the process of backing up the storage medium 20, but such an encryption operation may be performed in advance. Specifically, an encrypted document may be encrypted as soon as it is received and then stored in the volatile memory 130 as being encrypted.

The controller 160 sets a back-up flag in a predetermined area of a non-volatile memory of the image forming apparatus 100. Herein, the back-up flag is to inform that there is back-up data regarding print data, and the controller 160 may set the back-up flag in the predetermined area of a non-volatile memory if the print data stored in the volatile memory 130 is backed up in the storage medium 20. Herein, the non-volatile memory is a memory where a command related to the booting of the image forming apparatus 100 or setting information of the image forming apparatus 100 (for example, a serial number, the number of print papers, etc.) are stored.

In addition, the controller 160 converts the operation mode of the image forming apparatus 100. Specifically, if a power-off command is input from a user through the communication interface unit 110 or the user interface unit 120, the operation mode of the image forming apparatus 100 may be converted to a power-off mode after the above back-up operation is performed.

If a power-on command is input, the controller 160 boots the image forming apparatus 100. In this case, the controller 160 may determine whether there is back-up data regarding print data. Specifically, the controller 160 may determine whether there is back-up data based on whether a back-up flag which indicates the existence of the back-up data is set in a predetermined area of the non-volatile memory of the image forming apparatus 100.

If a back-up flag is set, the controller 160 determines whether the storage medium 20 is connected. If the storage medium 20 is not connected, the controller 160 may control the user interface unit 120 to display a notification that connection with a storage medium is required. According to an exemplary embodiment, the controller 160 may control the communication interface unit 110 to transmit a message informing of the necessity of connection with a storage medium 20 where back-up data is stored to the host apparatus 10 so that the above displaying operation may be performed in the host apparatus 10.

If there is back-up data, the controller 160 restores the backed-up print data stored in the storage medium 20 to the volatile memory 130. Specifically, the controller 160 may restore a file having a predetermined extension (for example, INF, JCB, DAT and ENC) from among a plurality of files stored in the storage medium 20 by copying the file into a volatile memory. Herein, the predetermined extension is an extension of general print data and an extension given to encrypted print data. Meanwhile, in the exemplary embodiment, whether a file is print data or not is determined by using the extension of a file, but according to an exemplary embodiment, whether a file is print data or not may be determined not only by using the extension of a file or checking the actual data contents of a file.

In the process of the restoration, the controller 160 determines whether the backed-up data in the storage medium 20 is encrypted data. If the data is determined not to be encrypted (for example, a file having the extension of INF, JCB and DAT), the controller 160 may copy and restore the print data stored in the storage medium 20 in the volatile memory 130, and if the data is encrypted (for example, a file having the extension of ENC), the controller 160 may control the encryption unit 140 to perform decryption so that the decrypted print data may be stored in the volatile memory 130. In this case, the controller 160 may determine whether the corresponding data is encrypted data by using the extension (for example, ENC) of the backed-up print data in the storage medium 20.

If restoration regarding the back-up data is completed, the controller 160 may delete print data which is backed up in the storage medium 20. In this case, the controller 160 may delete a back-up flag set in the predetermined area of the non-volatile memory.

As described above, the image forming apparatus 100 according to an exemplary embodiment may store and manage a plurality of print data without having a large-scale storage medium. In addition, even if the image forming apparatus 100 is turned off or turned on, print data may be retained stably.

Alternatively to the operations of the image forming apparatus 100 as described in FIG. 1, the image forming apparatus 100 may receive print data from the storage medium 20 and may back up print data in the host apparatus 10.

FIGS. 2 and 3 are views illustrating various examples of a user interface window which can be displayed on a user interface unit of FIG. 1.

Referring to FIG. 2, a user interface window 200 comprises a message area 210 to inform a user that there is print data to be backed up and to inquire to a user whether a back-up operation to back-up print data stored in the volatile memory 130 is desired, a Yes area 220, and a No area 230.

The Yes area 220 is an area to receive a command to proceed with a back-up operation. Thus, if the Yes area 220 is selected, the image forming apparatus 100 may perform a back-up operation as described above.

The No area 230 is an area to receive a user command not to proceed with a back-up operation. Thus, if the No area 230 is selected, the image forming apparatus 100 may convert the operation mode of the image forming apparatus 100 to a power-off state without performing a back-up operation.

Referring to FIG. 3, a user interface window 300 comprises a message area 310 to inform a user that a storage medium is not connected, a confirmation area 320, and a termination area 330.

More specifically, the message area 310 is an area to inform a user that there is no connection to a storage medium presently, and inquires whether a connection with a storage medium is desired, since print data to be backed up exists but there is no storage medium connected to the image forming apparatus 100 to back up the print data.

The confirmation area 320 is an area to receive a command to resume a back-up operation as a user connects the image forming apparatus 100 to a storage medium. Thus, if the confirmation area 320 is selected, the image forming apparatus 100 may perform a back-up operation as described above.

FIG. 4 is a view illustrating an example of a look-up table which can be stored in a volatile memory.

Referring to FIG. 4, a look-up table includes information regarding index, job ID, job type, and storage file of each print data.

Herein, the index is a number which is assigned to print data in the order of storage, and the job ID is an ID which is assigned when a job is created.

The job type represents information regarding whether the corresponding print data is, for example, a first type of storage document (general storage and printing) or a second type of storage document (security storage and printing).

The storage file information represents information regarding a file constituting the corresponding print data.

In the above description with respect to FIG. 4, the look-up table stores only information regarding index, job ID, job type, and storage file, but the look-up table may also store information regarding the storage time of the corresponding storage document or security document (until when the document should be stored), information regarding the time when the corresponding print data is received, and information regarding the number of times that the corresponding print data is printed.

Figure 5:
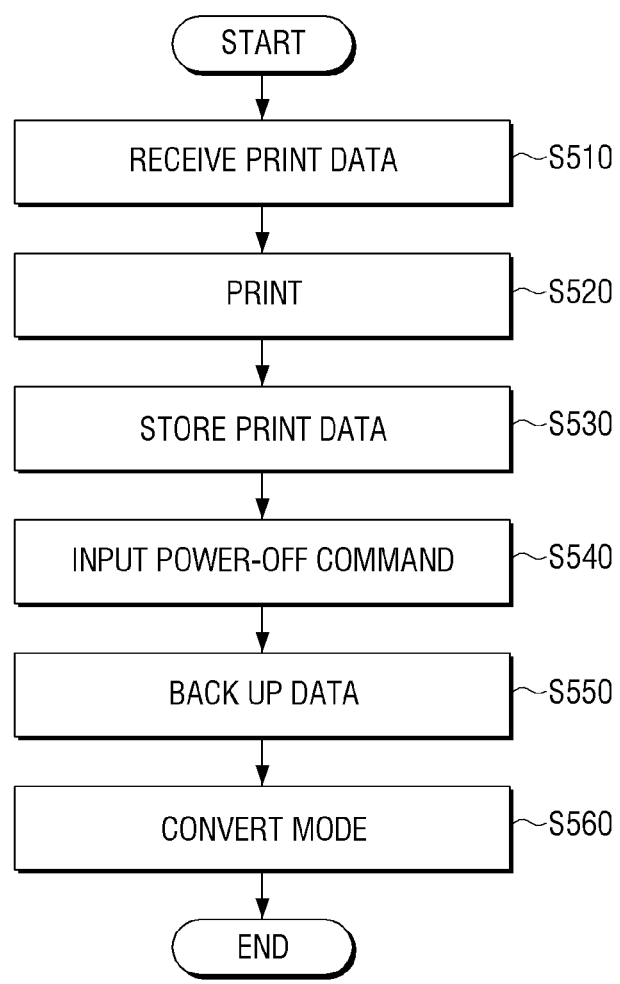
FIG. 5 is a flowchart provided to explain operations of an image forming method according to an exemplary embodiment.

FIG. 5 is a flowchart provided to explain operations of an image forming method according to an exemplary embodiment.

Regarding the exemplary method of FIG. 5, first, print data is received by the image forming apparatus 100 (operation S510). Herein, the print data may be data with respect to printing language such as Postscript (PS), Printer Control Language (PCL) and etc., and if direct-printing is supported by the image forming apparatus 100, may be PDF, XPS, BMP, JPG, a text document (TXT), etc. The print data may store information regarding whether the print data is stored and secured (via a security) in the image forming apparatus 100.

In operation S520 the received print data is printed. Meanwhile, although this exemplary embodiment illustrates and explains that the received print data is printed immediately, alternatively such a printing operation may be omitted. That is, if a command to store print data without a printing operation is input from a host apparatus, such a printing operation may be omitted.

If the received print data is data which needs to be stored, the received print data is stored in a volatile memory (operation S530). Specifically, if the job type of the received print data is a storage document or a security document, it is determined that the received print data needs to be stored, and thus, the received print data may be stored in a volatile memory. In this case, the print data may be stored in a volatile memory by job unit.

If a power-off command regarding the image forming apparatus is input (operation S540), the print data stored in the volatile memory is backed up in a storage medium which is connectable to the image forming apparatus (operation S550). Specifically, if a power-off command is input, it is determined whether print data exists in the volatile memory 130 to determine whether it is necessary to perform a back-up operation. If it is determined that a document which needs to be stored is stored in the volatile memory 130 and the job type of the print data stored in the volatile memory 130 is a storage document, the corresponding print data may be copied and backed up in the storage medium 20. Alternatively, if the job type of the print data stored in the volatile memory 130 is a security document, the corresponding print data may be encrypted, and the encrypted print data may be copied and backed up in the storage medium 20.

The operation mode of the image forming apparatus is converted to a power-off mode (operation S560).

As such, the image forming apparatus according to an exemplary embodiment may store and manage a plurality of print data without a large-scale storage medium. In addition, even if the image forming apparatus 100 is turned off or turned on, print data may be retained stably. The image forming method illustrated in FIG. 5 may be executed not only in an image forming apparatus having the configuration of FIG. 1, but also in an image forming apparatus having another type of configuration.

The above-described image forming method may be realized as a program (or an application) including an algorithm executable in a computer, and the program may be stored in a non-transitory computer readable medium and provided therein.

Herein, the non-transitory recordable medium refers to a medium which may store data semi-permanently rather than storing data for a short time such as a register, a cache, and a memory and may be readable by an apparatus. Specifically, the above-mentioned various applications or programs may be stored in a non-temporal recordable medium such as CD, DVD, hard disk, Blu-ray disk, USB, memory card, and ROM and provided therein.

Figure 6:
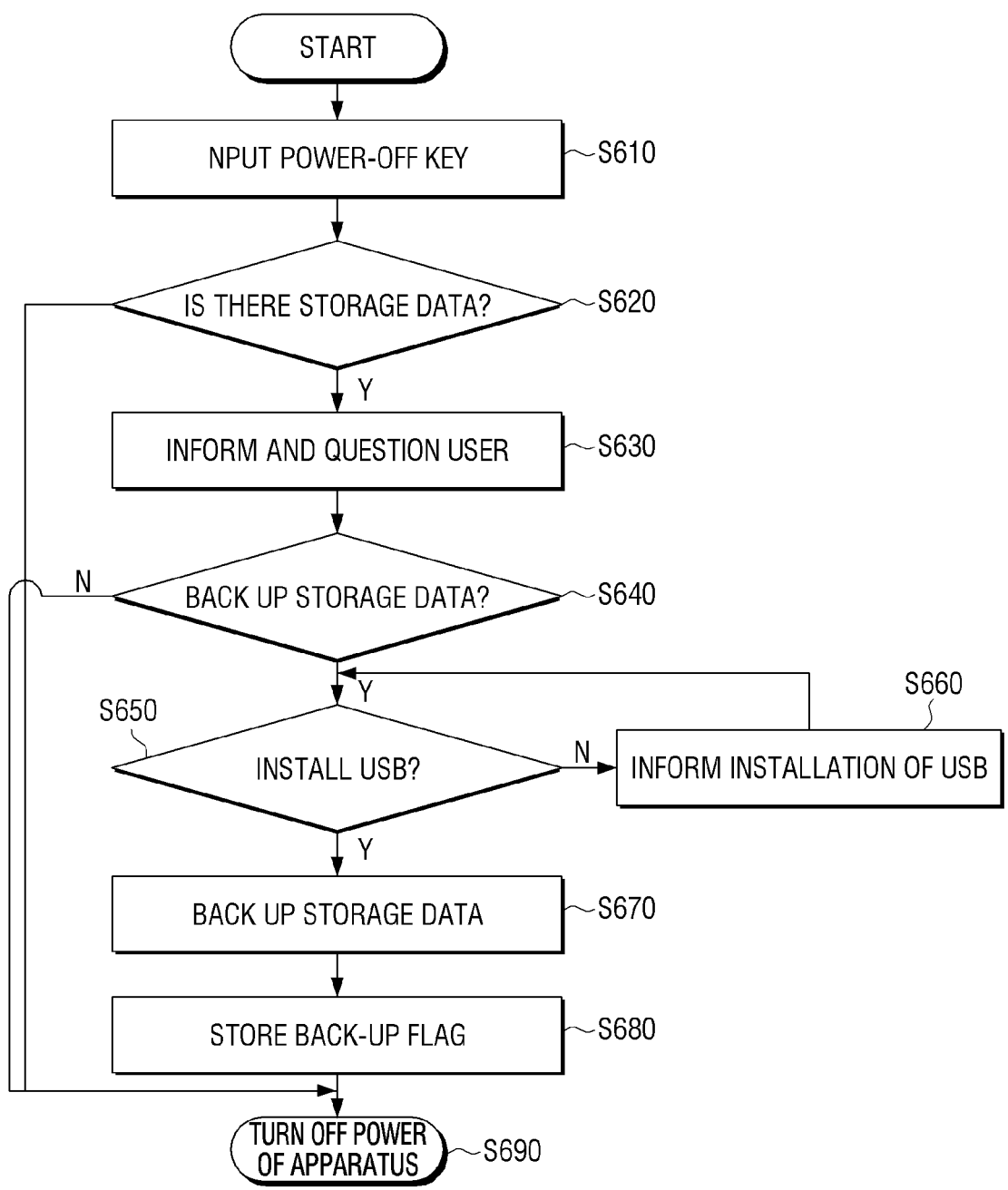
FIG. 6 is a flowchart provided to explain a back-up operation of FIG. 5 in detail.

FIG. 6 is a flowchart provided to explain a back-up operation of FIG. 5 in detail.

Referring to FIG. 6, first of all, if a power-off command is input (operation S610), it is determined whether print data is stored (operation S620). Specifically, whether it is necessary to perform a back-up operation may be determined by checking whether print data is stored in a volatile memory.

In addition, confirmation regarding a back-up operation is received (operation S630). Specifically, if a power-off command is input, and if it is determined that a back-up operation is required, it may be displayed that a back-up operation is required. According to an exemplary embodiment, a message informing the necessity of a back-up operation may be transmitted so that the above displaying operation may be performed in a connected host apparatus.

Subsequently, it is determined whether a command to proceed with a back-up operation is received (operation S640). If a command to proceed with a back-up operation is not input from a user (operation S640—N), the operation mode of the image forming apparatus may be converted to a power-off mode without a back-up operation (operation S690).

On the other hand, if a command to proceed with a back-up operation is input from a user (operation S640—Y), it may be determined whether a storage medium is connected (operation S650). According to an exemplary embodiment, not only whether a storage medium is connected but also whether the storage medium has sufficient storage capacity may be determined.

If it is determined that a storage medium is not connected, a user may be informed that connection with a storage medium is required (operation S660).

If a storage medium is connected, the print data stored in the volatile memory is backed up in the connected storage medium (operation S670). The specific back-up operation will be explained later with reference to FIG. 7.

Subsequently, a back-up flag is set (operation S680). Herein, the back-up flag is to inform users that there exists back-up data regarding the print data, and if the print data stored in the volatile memory 130 is backed up in the storage medium 20, the back-up flag may be set in a predetermined area of a non-volatile memory.

Once the back-up operation is completed, the operation mode of the image forming apparatus may be converted to a power-off mode (operation S690).

Figure 7:
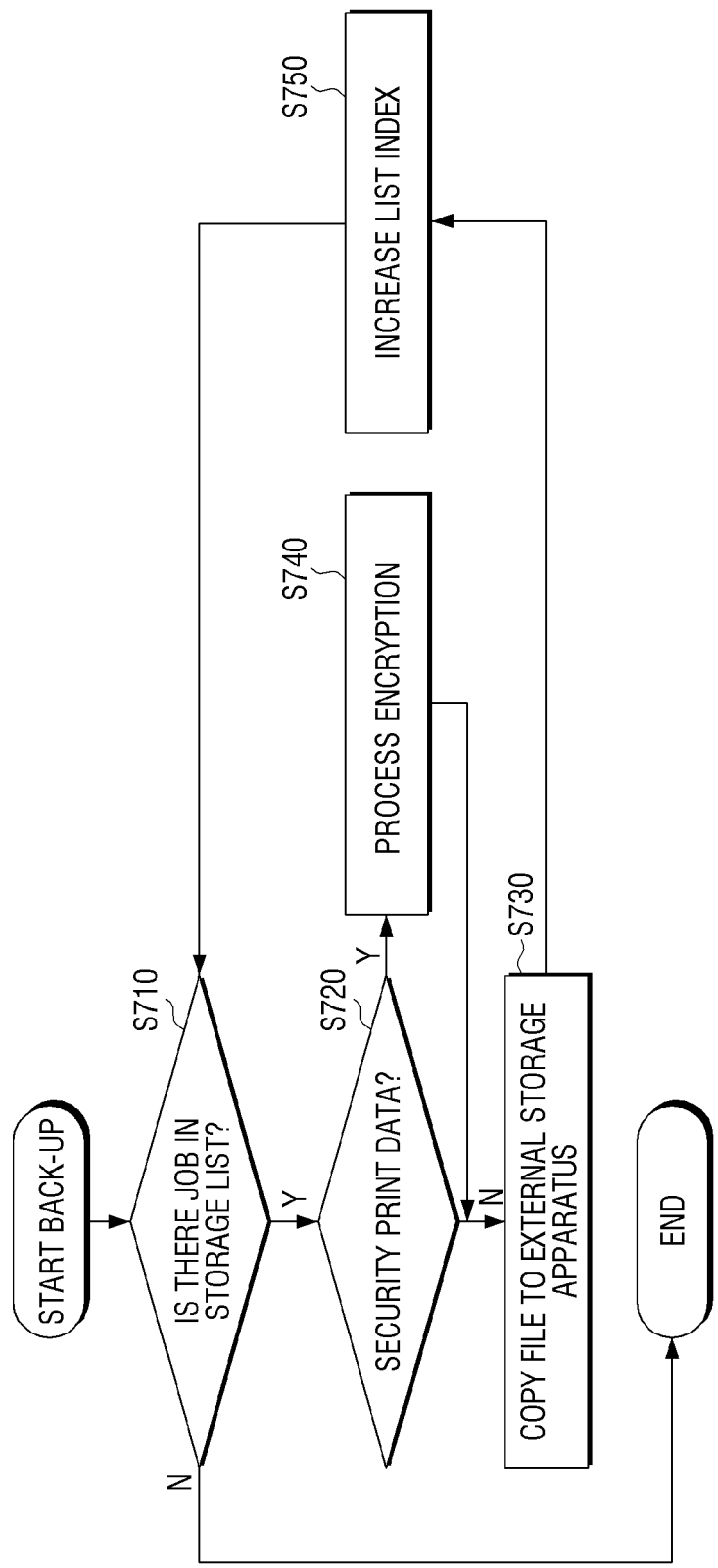
FIG. 7 is a flowchart provided to explain a back-up operation of storage data of FIG. 6.

FIG. 7 is a flowchart provided to explain a back-up operation of storage data of FIG. 6.

Referring to FIG. 7, first, it is determined whether a job exists in a storage list (that is, a look-up table) (operation S710). If it is determined that there is no job in the storage list (operation S710—N), then there is nothing to be backed up, and thus a back-up operation is terminated.

On the other hand, if there is a job in the storage list (operation S710—Y), it is determined whether print data subject to the first job is security print data (operation S720).

If the corresponding print data is determined not to be security print data (operation S720—N), the corresponding print data may be copied and backed up in a storage medium (operation S730).

If the corresponding print data is determined to be a security print data (operation S720—Y), the corresponding print data is encrypted (operation S740). In addition, the encrypted print data is copied and backed up in the storage medium (operation S730).

Subsequently, the list index is increased (i.e., incremented to the next data) (operation S750), and a back-up operation regarding the next print data is repeated by performing the above-described back-up operation.

Figure 8:
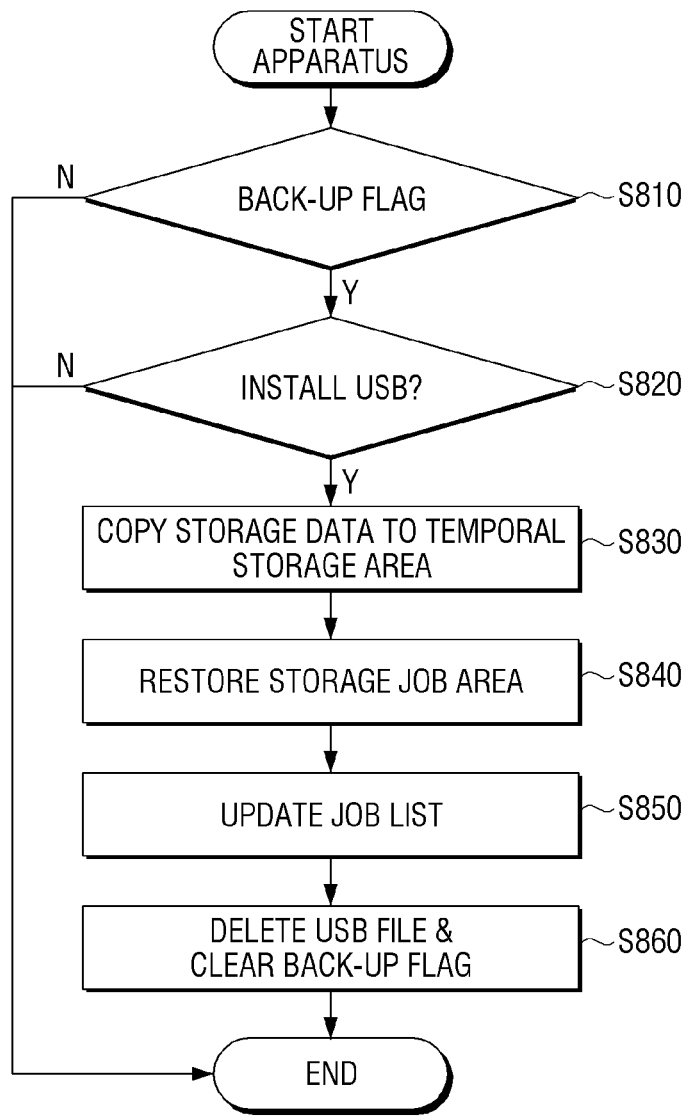
FIG. 8 is a flowchart provided to explain a restoring operation according to an exemplary embodiment.

FIG. 8 is a flowchart provided to explain a restoring operation according to an exemplary embodiment.

First of all, if the image forming apparatus 100 is booted according to a power-on command, it is determined whether there is back-up data regarding print data (operation S810).

Specifically, whether there is back-up data may be determined by checking whether a back-up flag informing of the existence of back-up data is set in a predetermined area of a volatile memory (operation S810).

If a back-up flag is not set (operation S810—N), it is determined that there is no print data, and thus the operation is terminated without any restoration operation.

On the other hand, if a back-up flag is set (operation S810—Y), it is determined whether a storage medium is connected (operation S820). If it is determined that a storage medium is not connected (operation S820—N), the operation is terminated without any restoration operation. Meanwhile, in the exemplary embodiment, a restoration operation is not performed if a storage medium is not connected, however, depending on exemplary embodiments, a user may be informed that connection with a storage medium is required, and the image forming apparatus will be in standby status until a storage medium is connected.

If a storage medium is connected (operation S820—Y), the print data backed-up in the storage medium 20 is restored to the volatile memory (operations S830 and S840). The specific restoration operation will be explained later with reference to FIG. 6.

Subsequently, a job list is updated (operation S850). Specifically, a new look-up table may be created with reference to the print data restored in the volatile memory.

The print data backed up in the storage medium is deleted, and the back-up flag is cleared (operation S860). Specifically, in order to prevent a leak of print data by the storage medium, the print data stored in the storage medium may be deleted once the restoration operation is completed, and then the back-up flag is deleted.

Figure 9:
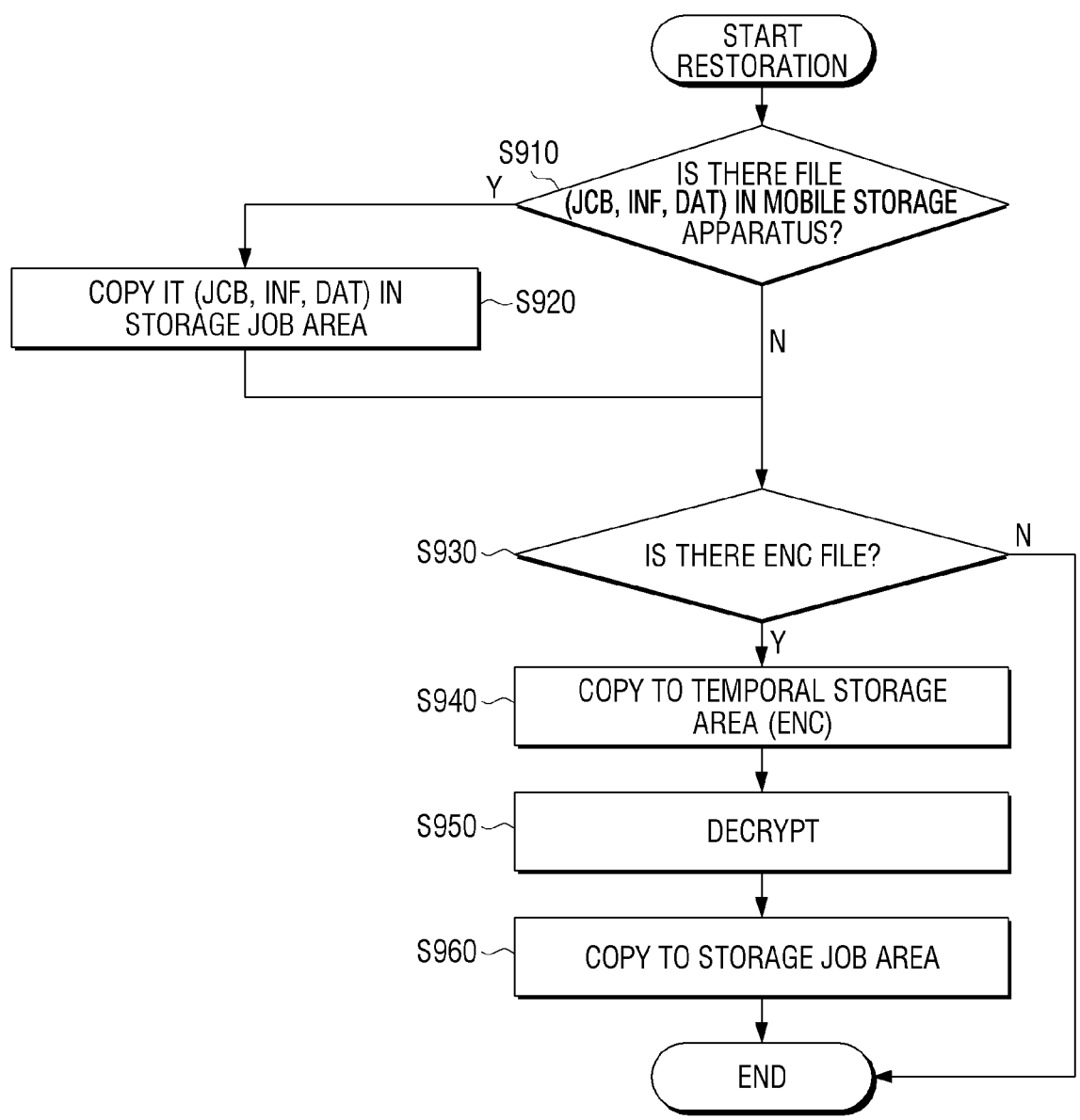
FIG. 9 is a flowchart provided to explain a copying operation of FIG. 8.

FIG. 9 is a flowchart provided to explain a copying operation of FIG. 8 in detail.

Referring to FIG. 9, it is determined whether there is a file having a predetermined first extension in a mobile medium (operation S910). Herein, the first extension is an extension of general print data.

If there is a file having the first extension (operation S910—Y), the corresponding file is copied in an operation area of a volatile memory (operation S920).

If there is not a file having the first extension (operation S910—N), it is determined whether a file having a predetermined second extension is in a mobile medium (operation S930). Herein, the second extension is an extension assigned to encrypted print data.

If there is not a file having the second extension (operation S930—N), a restoration operation is terminated.

Meanwhile, if there is a file having the second extension (operation S930—Y), the file having the second extension is copied in a temporal storage area (operation S940).

Subsequently, the file having the second extension is decrypted (operation S950), and the decrypted print data is copied in an operation area of a volatile memory (operation S960).

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:
1. An image forming apparatus, comprising:
a communication interface unit which receives print data including image data;
an image forming unit which prints the received print data;

a volatile memory which, if the received print data is data that needs to be stored, stores the received print data; and
a controller which, if a power-off command regarding the image forming apparatus is input, backs up print data, including the image data that is stored in the volatile memory, in a storage medium connectable to the image forming apparatus and converts an operation mode of the image forming apparatus to a power-off mode;
wherein the controller, if the image forming apparatus is booted, determines whether there is back-up data regarding print data by checking whether a back-up flag informing existence of back-up data regarding print data is set in a non-volatile memory.

2. The apparatus of claim 1, further comprising:
a user interface unit which if the power-off command regarding the image forming apparatus is input and print data is stored in the volatile memory, receives confirmation regarding whether the stored print data is backed up,
wherein the controller, if a back-up command is input through the user interface unit, backs up print data stored in the volatile memory in the storage medium.

3. The apparatus of claim 1, further comprising:
a user interface unit which, if the power-off command regarding the image forming apparatus is input and there is no storage medium connectable to the image forming apparatus, displays that connection with a storage medium is required.

4. The apparatus of claim 1, wherein the controller sets a back-up flag informing existence of back-up data regarding print data in a predetermined area of a non-volatile memory of the image forming apparatus.

5. The apparatus of claim 1, wherein the controller, if the image forming apparatus is turned on, restores print data backed up in the storage medium to the volatile memory.

6. The apparatus of claim 5, wherein the controller, if the print data backed up in the storage medium is restored to the volatile memory, deletes the print data backed up in the storage medium.

7. The apparatus of claim 1, wherein the controller, if the print data is received, stores the received print data in the volatile memory.

8. The apparatus of claim 1, wherein the received print data includes information regarding at least one of whether the received print data is data that needs to be stored and whether the received print data corresponds to security print data.

9. The apparatus of claim 1, wherein the received print data, including the image data, is backed up in the storage medium, which is a non-volatile memory.

10. The apparatus of claim 1, further comprising: an encryption unit which encrypts the stored print data,
wherein the controller backs up the encrypted print data in the storage medium.

11. The apparatus of claim 10, wherein the controller backs up the encrypted print data in the storage medium using a predetermined extension.

12. The apparatus of claim 1, further comprising: encrypting the print data,
wherein the encrypting comprises backing up the encrypted print data in the storage medium.

13. The method of claim 12, wherein the backing up comprises backing up the encrypted print data in the storage medium using a predetermined extension.

14. An image forming method of an image forming apparatus, comprising:
receiving print data including image data;
printing the received print data;
if the received print data is data that needs to be stored, storing the received print data in a volatile memory;
if a power-off command regarding the image forming apparatus is input, backing up the stored print data, including the image data that is stored in the volatile memory, in a storage medium connectable to the image forming apparatus; and
converting an operation mode of the image forming apparatus to a power-off mode,
if the image forming apparatus is booted, determining whether there is back-up data regarding print data by checking whether a back-up flag informing existence of back-up data regarding print data is set in the non-volatile memory.

15. The method of claim 14, further comprising:
if a power-off command regarding the image forming apparatus is input and print data is stored in the volatile memory, receiving confirmation regarding whether the stored print data is backed up,
wherein the backing up comprises, if a back-up command is input through the user interface unit, backing up print data stored in the volatile memory in the storage medium.

16. The method of claim 14, further comprising: if a power-off command regarding the image forming apparatus is input and there is no storage medium connectable to the image forming apparatus, displaying that connection with a storage medium is required.

17. The method of claim 14, further comprising:
setting a back-up flag informing existence of back-up data regarding print data in a predetermined area of a non-volatile memory of the image forming apparatus.

18. The method of claim 14, further comprising:
if the image forming apparatus is turned on, restoring print data backed up in the storage medium to the volatile memory.

19. The method of claim 18, further comprising:
if the print data backed up in the storage medium is restored to the volatile memory, deleting the print data backed up in the storage medium.

20. The method of claim 14, wherein the storing comprises, if the print data is received, storing the received print data in the volatile memory.

21. The method of claim 14, wherein the received print data includes information regarding at least one of whether the received print data is data that needs to be stored and whether received the print data corresponds to security print data.

22. A non-transitory computer readable recording medium including a program to execute an image forming method, wherein the image forming method comprises:
receiving print data including image data;
printing the received print data;
if the received print data is data that needs to be stored, storing the received print data in a volatile memory;
if a power-off command regarding the image forming apparatus is input, backing up the stored print data, including the image data that is stored in the volatile memory, in a storage medium connectable to the image forming apparatus;
and converting an operation mode of the image forming apparatus to a power-off mode; and
if the image forming apparatus is booted, determines whether there is back-up data regarding print data by checking whether a back-up flag informing existence of back-up data regarding print data is set in a non-volatile memory.

* * * * *